May 3, 1960 D. EOLKIN 2,934,944
CONTINUOUS VISCOSIMETER
Filed Feb. 14, 1955 2 Sheets-Sheet 2
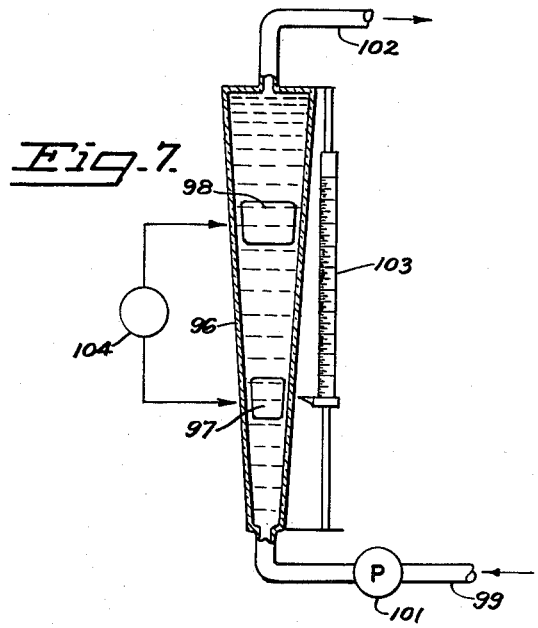
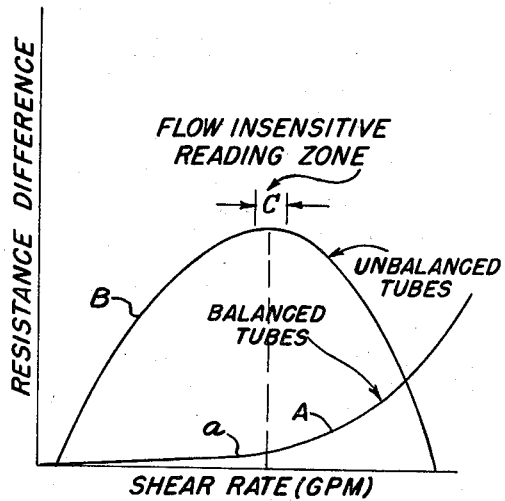
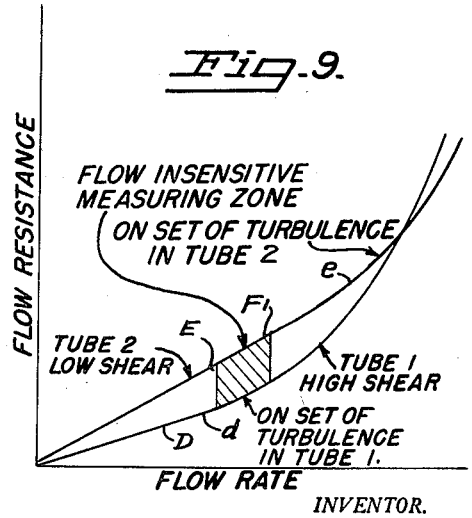
INVENTOR.
DAVE EOLKIN
BY
Townsend, Townsend and Hoppe
ATTORNEYS United States Patent Office 2,934,944
Patented May 3, 1960

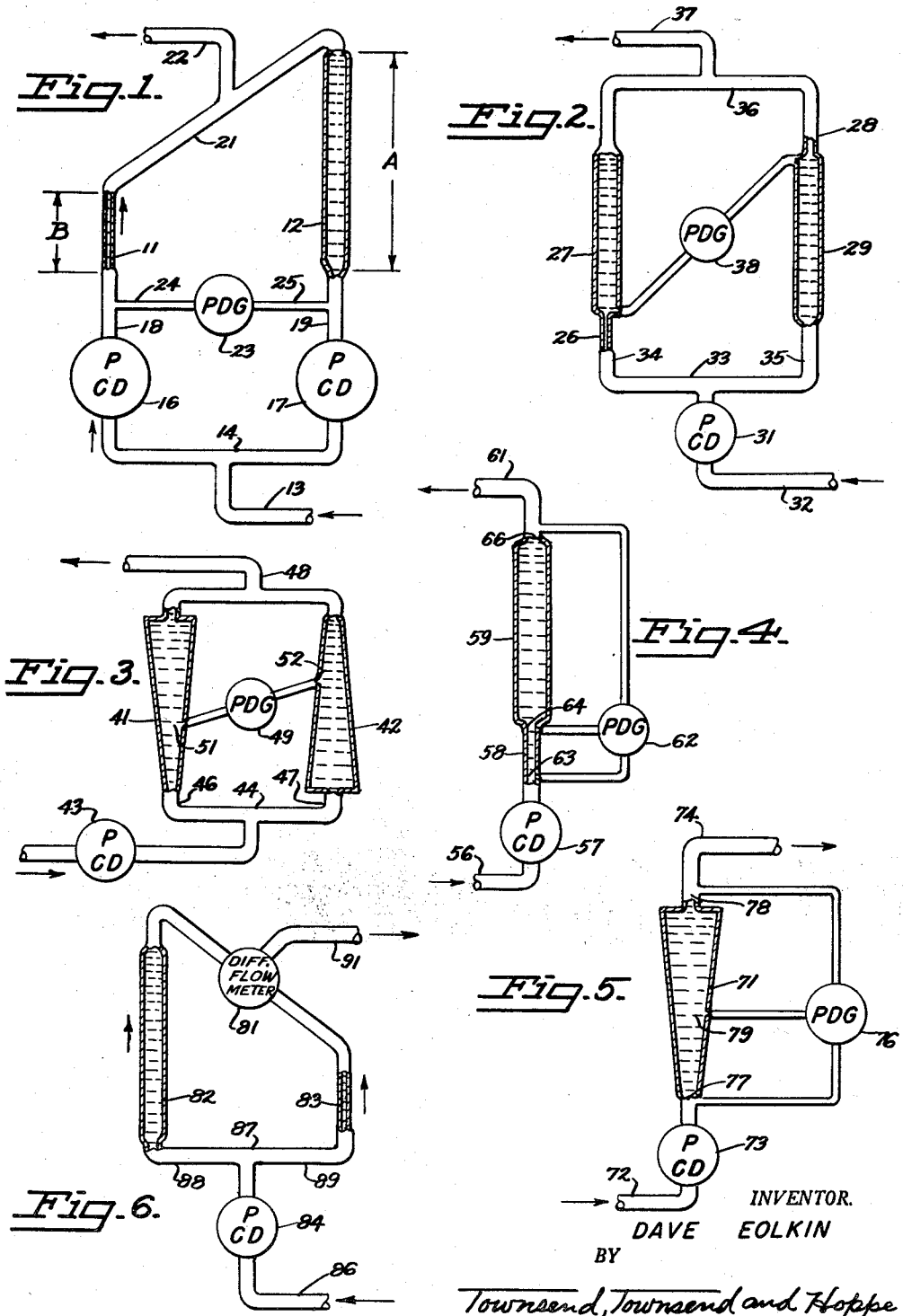

2,934,944
CONTINUOUS VISCOSIMETER

Dave Eolkin, San Lorenzo, Calif., assignor to Gerber Products Company, Newaygo, Mich., a corporation of Michigan Application February 14, 1955, Serial No. 487,752

23 Claims. (Cl. 73—55)

This invention relates to a new and improved continuous viscosimeter and method of continuously measuring liquiform product viscosity. The invention relates to rheological measurements of industrial products where it is desirable, from the standpoint of manufacturing controls, to obtain continuous readings and to control the viscosity of the product so that standards of uniformity may be maintained. Reference is made to my co-pending patent application Serial No. 431,441, filed May 21, 1954, on Continuous Consistometer and Method of Measuring and Controlling Liquiform Product Consistency Continuously.

For the purpose of this invention, liquids may be classified in two types—namely, Newtonian liquids and non-Newtonian liquids. A Newtonian liquid may be defined as one in which the viscosity does not vary with the rate of shear within the non-turbulent flow range, whereas a non-Newtonian liquid is one in which the viscosity is variable with the rate of shear in the non-turbulent flow range. Newtonian liquids comprise such materials as water, gasoline, glycerin, mineral oils, etc., whereas non-Newtonian liquids comprise food purees, starch jells, lubricating greases, printing inks, clay suspensions, paints, etc. In the latter types of liquids, when viscosity is plotted as a function of rate of shear, a curve is produced rather than a straight line. When viscosity of Newtonian liquids is plotted as a function of rate of shear, a straight line is produced. The "rate of shear" is a concept which may be defined as follows: Let it be assumed that there are two parallel planes of infinite length A and B, spaced apart a distance "$bd$," the intervening space being filled with the liquid under test. A tangential shearing stress is applied parallel to plane A immediately adjacent plane A. The A plane then moves with respect to B, carrying with it the innumerable parallel planes of liquid existing between A and B. Each plane, however, is carried a different distance, the top plane A moving farthest with respect to the bottom plane B, which remains stationary. When point "$b$" in the A plane reaches point "$c$," after the shearing stress is applied for a given interval, the distance between $b$ and $c$ divided by the time interval gives the velocity of A with respect to B. The distance $bc$ divided by the distance $bd$ (the distance between the two planes) becomes the rate of shear. This is customarily written as $$\frac{dv}{dr}$$

where $v$ is velocity and $r$ is the distance between the planes. The foregoing definition is based upon "Industrial Rheology and Rheological Structures," by Harry Green, John Wiley & Sons, Inc., 1949. The definition of other terms used in this description of this invention will be based in large part upon that work.

In the hereinafter described method and apparatus for measuring the viscosity at different rates of shear, instruments are described at which the viscosity is measured continuously at two distinct and different rates of shear. The value of the viscosimeter is that by reason of the fact that the measurement is at two different rates of shear, the device may be insensitive to the flow through the system, whereas in other capillary viscosimeters, sensitivity to the flow is such that any substantial variation of flow will affect the accuracy of the reading of the instrument.

Another feature of the invention is that it is adaptable to range suppression. Where the viscosity of a fluid being measured is customarily within a limited range, it is possible by adjustment of the length and diameter of the tubes, as hereinafter described, to establish a range of extreme accuracy of the instrument within the normal range of viscosity of the fluid.

Accordingly, by changing the relative lengths and the relative diameters of the tubes employed, the sensitivity of the device and its range can be predetermined to the best advantage for the particular type of fluid being measured.

Other objects of the present invention will become apparent upon reading the following specification and referring to the accompanying drawings in which similar characters of reference represent corresponding parts in each of the several views.

In the drawings:

Figs. 1–7, inclusive, are schematic views of various modifications of continuous viscosimeters, the exact details of which are hereinafter described;

Fig. 8 is a typical graph wherein shear rate is plotted against resistance difference for apparatus of the type of Figs. 1–7 showing separately the apparatus in balance and out of balance; and Fig. 9 is a typical graph wherein flow rate is plotted against flow resistance for apparatus out of balance and illustrating a zone wherein the reading of the apparatus is substantially insensitive to flow rate.

In Fig. 1, two capillary tubes 11 and 12 of different lengths and different diameters are shown. The product entering through pipe 13 branches at T 14 and is pumped by two constant and volume type pumps 16 and 17 of identical capacity through branches 18 and 19 in which are installed the tubes 11 and 12, respectively, the discharge from the branches being brought together through conduit 21 and discharged through pipe 22. The viscous resistance of the small tube 11 is considerably less than that of the large tube 12 for flow of a Newtonian fluid. Thus, the viscous resistance of the shorter tube 11 is greater per inch of length than the longer tube 12 and the lengths are adjusted so that the total viscous resistances are diverse. A pressure differential gauge 23 is installed with leads 24 and 25 to the bases of the two tubes 11 and 12. As shown in the graph set forth in Fig. 8, assuming that the tubes 11 and 12 were balanced—i.e., that the viscous resistance of each tube for a Newtonian fluid were identical, then a reading on curve A of resistance difference on the gauge 23 at different shear rates (which is, in this case, the gallons per minute passing through the system) would be practically zero until turbulent flow occurred at point $c$ in the smaller diameter tube, whereupon the gauge reading would begin to increase in an ascending curve. With the tubes unbalanced, the reading of the gauge 23 for different shear rates is illustrated by curve B wherein the effect of the unbalance is for first the small tube 11 to reach turbulent flow and later the large tube 12, thus causing first a rise and then a fall of curve B with a relatively flat zone marked C commencing at about the point where turbulent flow commences in tube 11 (point a) and extending for a distance beyond this point. In the zone marked C, the reading of gauge 23 is relatively insensitive to the rate of flow, because of the flatness of the curve.

Turning now to Fig. 9, wherein flow resistance is plotted against flow rate, the curve D represents the flow resistance of small diameter tube 11, whereas the curve E represents the large diameter tube. Inasmuch as the velocity is greater in the small diameter tube 11, the flow in said tube changes over (at point d) to turbulent flow at a lower flow rate than point e on curve E in the large diameter tube. The shaded area FI in the graph lying between the curves D and E indicates the measuring zone of the apparatus wherein the reading on gauge 23 is insensitive to the flow rate.

The foregoing insensitivity to flow rate is of great importance in the accuracy of the quipment. It has been assumed in the foregoing description that the pumps 16 and 17 are of identical constant volume. However, in practical commercial pumps, such accuracy is not obtained. Accordingly by calibrating the equipment so that measurements are made in the shaded area where the two curves are a fixed distance apart throughout an extended range of flow rates, reasonably severe inaccuracies in the pumps 16 and 17 do not affect the reading of gauge 23, hence despite such pump inaccuracies, changes in reading of gauge 23 indicates change in the viscosity of the product going through the pipe 13. Upon noting such changes in the reading of the gauge 23, the attendant may adjust the ingredients entering into the product so that a constant viscosity is obtained.

In Fig. 2 a different arrangement of capillary tubes is shown, although the result is substantially the same. On one side of the device are two tubes 26 and 27 joined end to end, tube 26 being of smaller diameter and tube 27 of larger diameter. The corresponding tubes 28 and 29 on the opposite sides are identical, but reversed in position. Diameters and lengths of the tubes are such that the viscous resistance for a Newtonian liquid in small tube 26 or 28 is less than that in a large tube 27 or 29. Thus, for example, assuming that tubes 26 and 28 are ¼ inch in diameter and that tubes 27 and 29 are ⅜ inch in diameter, if the four tubes were balanced in their viscous resistance for Newtonian fluid, tubes 26 and 28 would each be approximately 6 inches in length, whereas tubes 27 and 29 would be approximately 27.5 inches in length. In order to measure changes in viscosity, the tubes are unbalanced by making tubes 26 and 28 four inches in length rather than six inches. A single constant volume pump 31 is employed in the system shown in Fig. 2, the product entering through pipe 32 being pumped through pump 31 and divided at T 33 to flow equally through the tube branches 34 and 35 having identical total viscous resistance and joined together at the outlet 36 and carried off by discharge pipe 37. A pressure differential gauge 38 is installed to compute the difference in pressure between the top of the small tube 26 on one side and the top of the large tube 29 on the other side.

In Fig. 3, two identical tapered capillary tubes 41 and 42 are employed, the two tubes being reversed in direction. A single constant volume pump 43 is employed in the discharge of the pump as divided at T 44 equally into the two branches 46 and 47 and the discharge from the tapered tubes 41 and 42 is brought together and discharged through a single pipe 48. A pressure differential gauge 49 is installed having its leads connected to resistance points 51 and 52. These two points are located an identical distance from the small end of each tube. However, points 51 and 52 are not balanced points for Newtonian fluids, but are purposely unbalanced i.e., points 51 and 52 being located closer to the small ends of the tubes 41 and 42 than would be the case were the tubes in balance.

In Figs. 1 to 3, inclusive, the flow has been divided into two branches, the volume of flow through each branch being substantially identical.

In Fig. 4, a single line of flow is employed. Fluid enters through pipe 56 and is pumped by pump 57, first through small diameter capillary tube 58 and thence through large diameter capillary tube 59, tubes 58 and 59 being connected end to end, and thence out through pipe 61. A pressure differential gauge 62 is employed which measures the difference in pressure differentials between points 63 (at the bottom of tube 58) and 64 (at the connection between tubes 58 and 59) and between points 64 and 66 (at the top of tube 59). The diameters and lengths of capillaries 58 and 59 are such that for Newtonian fluids the viscous resistance of the two tubes is unbalanced.

In Fig. 5 a single flow is employed, but a tapered capillary 71 is used. Thus, the fluid is pumped from conduit 72 by pump 73, through the tapered tube 71 and is discharged through pipe 74. Pressure differential gauge 76 is employed, which is connected at three points: namely, point 77 at the bottom of the tube, point 78 at the top of the tube, and point 79 at a point intermediate points 77 and 78, which is closer to point 77 than the median viscous resistance point for a Newtonian fluid.

In the modification of Figs. 1–5, inclusive, the viscosity has been measured by measurement of difference in pressure. In Fig. 6 a differential flow meter 81 is employed, which measures the difference in flow. Thus, capillaries 82 and 83 are employed, their diameters and lengths being such that tube 83 has a lesser viscous resistance than tube 82 for a Newtonian fluid. Constant volume pump 84 draws product from pipe 86. The flow is divided at T 87 into two branches 88 and 89, one of the two tubes 82 and 83 being in each branch. The discharge of the tubes passes through flow meter 81 and out through pipe 91. Change in reading in the flow meter 81 indicates change in viscosity of the product.

The apparatus shown in Fig. 7 differs somewhat from that shown in the previous illustrations. The tapered tube 96 is employed and within the tube are two floats 97 and 98 having different weights. The material enters through pipe 99 and is pumped by constant volume pump 101 upwardly through the tube 96, and out through the discharge 102. Float 97 is in a different rate of shear zone than float 98 so that as viscosity of the product changes, the distance between the floats 97 and 98 changes. The heights of the respective floats may be read on a height gauge 103 and the distance between the two floats may be measured electrically, as indicated generally by electric gauge 104, as well understood in this art. The two floats are similar in shape and are of a shape such that they are sensitive to changes in viscosity and not particularly sensitive to changes in flow. It will be apparent that instead of a single tube 96, two separate tubes may be employed (as at Fig. 3), with a float in each tube.

In all of the foregoing modifications of the apparatus, so long as the range of flow through the apparatus is within the zone marked FI in the graph in Fig. 9, changes in the reading of the gauge will be responsive to changes in the viscosity of the product flow through the system and such changes will be accurate irrespective of minor variations in the flow through the system so long as these variations are within the limits of the zone marked FI. Accordingly, when the attendant observes a change in the reading of the gauge, appropriate adjustment may be made in the proportion of the ingredients entering into the product to restore the desired standard viscosity. It will also be understood by one skilled in the art that automatic controls of the proportions of the ingredients entering into the product may also be installed in the system so that as the gauge readings change, the adjustment of the ingredients to compensate for the changes may be made automatically.

Although the foregoing invention has been described in some detail by way of illustration and example for

What is claimed is:

1. A continuous viscosimeter comprising a conduit through which a fluid flows, first means comprising at least one capillary tube in fluid communication with said conduit said first means having at least two zones of different diameters, different viscous resistance and different rates of shear in the flow of fluid, the viscous resistance at both said zones increasing with increase in viscosity, said two zones being of different length, said fluid flowing substantially continuously through both said zones simultaneously, the flow resistance in the zone of higher rate of shear being substantially less than in the zone of lower rate of shear and means for measuring the difference in viscous resistance of the fluid in said different zones.

2. A continuous viscosimeter according to claim 1 in which said zones are established in different branches of flow.

3. A continuous viscosimeter according to claim 2 in which is provided means for pumping the same quantity of fluid through each branch and said second means comprises means for measuring the difference in pressure in each branch.

4. A continuous viscosimeter according to claim 2 in which said second means comprises means for measuring the difference in rate of flow through the two branches.

5. A continuous viscosimeter according to claim 2 in which the total viscous resistance in each branch is different.

6. A continuous viscosimeter according to claim 1 in which said zones are established at different locations in a single line of flow.

7. A continuous viscosimeter comprising an intake conduit, a first and a second branch leading from said intake conduit, a first capillary tube in said first branch, a second capillary tube in said second branch, said tubes being of different diameters, pressure means for flowing substantially equal and continuous flow mass through each said branch, the lengths and diameters of said tubes being such that the viscous resistance of one tube is considerly less than that of the other tube for flow of a Newtonian fluid, a pressure differential gauge for measuring the difference in pressure between the upstream ends of said first and second tubes, and a discharge conduit collecting the discharge of both said branches.

8. A viscosimeter according to claim 7 in which said pressure means comprises a first pump in said first branch and a second pump in said second branch, said pumps being of substantially the same capacity.

9. A viscosimeter according to claim 7 in which is further provided a third capillary tube in said first branch behind said first tube identical with said second tube and a fourth capillary tube in said second branch behind said second tube identical with said first tube.

10. A viscosimeter according to claim 7 in which said tubes are identical tapered tubes mounted in opposite directions and said gauge means is connected into each of said tubes intermediate the length thereof.

11. A continuous viscosimeter comprising an intake conduit, a pump in said conduit, a first capillary tube behind said pump, a second capillary tube behind said first capillary tube, said capillary tubes being of different diameters, a discharge conduit behind said second capillary tube, and a pressure differential gauge for measuring the difference in pressure between the intake of said first tube, the point of juncture of said tubes, and the discharge of said second tube, the relative lengths of said tubes being such that the total viscous resistance thereof for Newtonian fluids is a finite amount.

12. A continuous viscosimeter comprising an intake conduit, a pump in said conduit, a tapered capillary tube, a discharge conduit, and a gauge for measuring the difference in pressure between the bottom of said tube, a point intermediate the ends thereof, and the top of said tube and in which said point intermediate the ends of said tube is below the median point of viscous resistance for a Newtonian fluid.

13. A continuous viscosimeter comprising a tapered capillary tube, a first weight, a second weight, longitudinally spaced apart within said tube, said weights being of different mass, and being subject to differences in viscosity substantially insensitive to differences in flow rate, means for pumping fluid through said tube, and means for measuring the differences in distance between said weights.

14. A continuous viscosimeter comprising a branch of flow, means in said branch establishing a plurality of zones of different rates of shear, at least two weights of different mass which are sensitive to changes in viscosity and substantially insensitive to changes in flow rate, said weights being free to move throughout said zones, means for pumping fluid through said branch, and means for measuring the differences in distance between said weights.

15. A method of continuously measuring the viscosity of a substantially continuously flowing fluid comprising the steps of: establishing and maintaining a fluid stream of said fluid, confining said fluid stream, causing said stream to flow turbulently at a first locus and linearly at a second locus, progressively hindering the flow of said fluid in proportion to the increase in viscosity at both said loci, shearing said fluid at a first rate at said first locus, shearing said fluid at a second rate at said second locus, and measuring the difference in viscous resistance of said fluid to said first and second points of shearing.

16. The method of claim 15 accomplished by separately sensing the pressure of the fluid in each of said zones while said fluid is flowing through said zones and is subject to viscous resistance in said zones and measuring the difference in pressure at the two points of shearing.

17. The method of claim 15 in which said flow is divided into two parts and in which said first shearing occurs in the first of said parts and said second shearing occurs in the second of said parts.

18. The method of claim 17 wherein the volume of liquid of said first flow part is equal to that of the liquid of said second flow part, and separately sensing the pressure of the fluid at each of the points of shearing of said parts while said fluid is flowing through said parts and is subject to viscous resistance in said parts and measuring the difference in pressure of said first and second parts.

19. The method of claim 18 in which the difference in pressure at said first and second parts is finite.

20. The method of claim 15 in which said measuring is accomplished by measuring the difference in rate of flow of said first and second parts.

21. The method of claim 20 in which for a Newtonian fluid the difference in rate of flow of said first and second parts is finite.

22. The method of claim 15 in which the measuring is accomplished by suspending weights in said fluid stream at the two points of shearing and balance said weights by shear reaction of the weights to the fluid passing the weights and the buoyancy of the fluid and by measuring the difference in weight which can be supported at said two points of shearing.

23. The method of claim 15 in which said measuring is accomplished by progressively hindering the rate of flow in fine gradations at said first and second points of shearing, suspending weights of different mass in said fluid stream at said points and balancing said weights by the shear reaction of the weights to the fluid passing the weights and the buoyancy of the fluid and measuring the distance between said points at which two weights of different mass are held in equilibrium.

References Cited in the file of this patent

UNITED STATES PATENTS

| | | |
|---|---|---|
| 2,426,393 | Fischer | Aug. 26, 1947 |
| 2,437,247 | Fischer | Mar. 9, 1948 |
| 2,700,891 | Shafer | Feb. 1, 1955 |
| 2,716,337 | Fontein | Aug. 30, 1955 |

FOREIGN PATENTS

| | | |
|---|---|---|
| 396,529 | Germany | June 5, 1924 |

OTHER REFERENCES

Journal of Applied Physics, vol. 25, No. 1, January 1954, pp. 72–75.